United States Patent
Nakamura

(10) Patent No.: US 6,681,334 B2
(45) Date of Patent: Jan. 20, 2004

(54) DISK SENSOR POWER SYSTEM FOR SAMPLING OUTPUT SIGNAL OF DISK SENSOR AT PREDETERMINED MOMENTS RELATED TO POWER SAVING STATE

(75) Inventor: Satoshi Nakamura, Tachikawa (JP)

(73) Assignee: TEAC Corporation (JP)

( * ) Notice: Subject to any disclaimer, the term of this patent is extended or adjusted under 35 U.S.C. 154(b) by 599 days.

(21) Appl. No.: 09/732,582

(22) Filed: Dec. 8, 2000

(65) Prior Publication Data

US 2001/0005891 A1 Jun. 28, 2001

(30) Foreign Application Priority Data

Dec. 24, 1999 (JP) .............................. 11-366999

(51) Int. Cl.[7] .................... G06F 1/26; G11B 15/18; G11B 33/02
(52) U.S. Cl. .................. 713/300; 713/320; 360/69; 369/76
(58) Field of Search ................ 713/300, 320; 360/69, 75, 78.01; 369/75.1, 76

(56) References Cited

U.S. PATENT DOCUMENTS

| | | | |
|---|---|---|---|
| 5,155,638 A | * 10/1992 | Aikawa et al. | 360/69 |
| 5,400,190 A | 3/1995 | Miura | 360/69 |
| 5,408,369 A | * 4/1995 | Miura et al. | 360/75 |
| 5,455,723 A | * 10/1995 | Boutaghou et al. | 360/75 |
| 5,675,567 A | * 10/1997 | Skarda | 369/77.2 |
| 5,828,642 A | * 10/1998 | Skarda | 369/75.1 |
| 6,108,157 A | * 8/2000 | Yoneda et al. | 360/75 |
| 6,381,204 B1 | * 4/2002 | Kobayashi et al. | 369/47.3 |
| 6,512,652 B1 | * 1/2003 | Nelson et al. | 360/78.01 |

FOREIGN PATENT DOCUMENTS

JP 6-75449 * 3/1994

OTHER PUBLICATIONS

M. Sri–Jayantha, "Trends in Mobile Storage Design", IBM Research Division, IEEE 1995, pp. 54–57.*
Jeong et al., "Slider–Disk Interactions During the Load–unload Process", IEEE 1990, pp. 2490–2492.*

* cited by examiner

*Primary Examiner*—Thomas Lee
*Assistant Examiner*—Chun Cao
(74) *Attorney, Agent, or Firm*—Woodcock Washburn LLP

(57) ABSTRACT

A flexible magnetic disk drive with a built-in USB interface is disclosed. A disk sensor produces an output that, in the event of a change from one disk to another during a SUSPEND state of a SUSPEND/RESUME signal, remains indicative of disk absence from the moment said one disk was unloaded to, at the earliest, the moment the SUSPEND/RESUME signal subsequently gains a RESUME state, for power-saving purposes. In order to enable the computer to know the occurrence of the disk change immediately upon resumption of disk drive operation, the disk sensor output is sampled approximately at the beginning and end of each SUSPEND state, and immediately after the beginning of each RESUME state, of the SUSPEND/RESUME signal. Six different possible histories of disk loading and unloading past each SUSPEND state are ascertainable from every three disk sensor output samples. Each such renewable history datum is stored on a memory in the interface, for delivery to the computer on demand.

14 Claims, 6 Drawing Sheets

DISK SENSOR POWER SYSTEM FOR SAMPLING OUTPUT SIGNAL OF DISK SENSOR AT PREDETERMINED MOMENTS RELATED TO POWER SAVING STATE

BACKGROUND OF THE INVENTION

This invention relates generally to a rotating disk data storage apparatus, particularly to a flexible magnetic disk drive (FDD) for use as a peripheral, and more particularly to such a device to be coupled to a processor, as typified by a personal computer (PC), by way of what are known to the specialists as universal serial buses (USB). Still more particularly, the invention deals with how to save greater power consumed by such a device, particularly by disk sensor means customarily incorporated therein, in response to a power saving signal, sometimes referred to as suspend/resume signal, that is fed from the processor.

FDDs in general are equipped with a disk sensor in order to inform the PC with which they are interfaced, of whether a disk is positioned on the turntable or not, as well as of whether a change has been made from one disk to another. U.S. Pat. No. 5,400,190 to Miura, dated Mar. 21, 1995 and assigned to the assignee of the instant application, is hereby cited as teaching a power saving system for the disk sensor.

The disk sensor as disclosed in this U.S. patent is a serial connection of a mechanical sensor switch and a pullup resistor. The sensor switch is held closed when a disk is not loaded on the turntable, holding the disk sensor output high, and opened when a disk is, making the disk sensor output go low.

Particularly in computer systems where two or more FDDs are connected to one computer, total power consumption by the disk sensors of all such peripherals is by no means negligible. The computer itself has indeed been designed for reduction of power consumed by FDDs in consideration of this mode of use, as manifested by so-called suspend/resume signals fed from the computer to the FDDs in order to avoid waste of power. The suspend/resume signal has a "suspend" state during which the FDD needs not be active and so may be held unpowered, and a "resume" state during which the FDD must be powered. The suspend/resume signal is therefore a power-saving signal, its "suspend" state representing a power-saving period, and its "resume" state a non-power-saving period. The suspend/resume signal will be sometimes referred to as power-saving signal in this specification.

Difficulties had been experienced, however, in reduction of power consumed by the disk sensors, among other power-consuming components of the FDDs. When the suspend/resume signal gains a "resume" state, the FDDs must be able to inform the computer of not only whether a disk is then loaded or unloaded, but whether a disk change has been made during the preceding "suspend" state. For this reason the disk sensors had long had to be held powered regardless of whether the FDDs in which they were incorporated were active or inactive.

U.S. Pat. No. 5,400,190, supra, represents a solution to this problem, teaching to connect the noted serial switch-resistor circuit of the disk sensor between an OR gate and ground. The sensor switch has its output fed back to the OR gate, to which is also supplied the power saving signal. Consequently, in the event of a disk change during a power saving period, the OR gate is held low, so that no current flows through the resistor.

This improved prior art disk sensor has proved to possess a shortcoming, particularly in applications where FDDs are USB interfaced with a PC. The FDD incorporating the prior art disk sensor has a flip-flop for memorizing, so to say, a disk change taking place when the FDD is inactive. The flip-flop maintains its state upon disk withdrawal until reset by a stepping pulse applied to the stepper motor for track seeking. Actually reset by a stepping pulse supplied upon resumption of FDD operation, the flip-flop puts out a signal indicative of a disk change. Thus, according to this prior art device, the PC was left uninformed of the disk change until appearance of the stepping pulses.

In most PC systems before the advent of the USB interfacing technology, the FDD controller (FDC) was built into the PC rather than into the FDD. The operating system of the PC has direct access to the FDC in this case, so that little or no inconvenience occurred as a result of the slight time lag between appearance of stepping pulses and reception of the disk change signal. However, when an FDD is USB interfaced with a PC, as has been an ever-growing trend in recent years, the FDC is included in the interface circuit that is built into the FDD, enabling the computer to be informed of the conditions of the FDC in real time.

SUMMARY OF THE INVENTION

The present invention seeks, in an FDD or like rotating disk data storage apparatus to be interfaced with a PC or like processor as a peripheral, to reduce waste of power by the disk sensor customarily incorporated in such apparatus and, at the same time, to let the processor know as quickly as possible a disk change that has occurred while the peripheral is inactive.

Briefly, the invention may be summarized as a rotating disk data storage system operating under the control of a processor, and comprising a data storage device and an interface. The data storage device includes disk sensor means for providing an output signal indicative of whether a data storage disk is in the device or not. The interface comprises power-saving means for generating a power-saving signal, such as the standard SUSPEND/RESUME signal, under the direction of the processor, the power-saving signal having a power-saving state, indicative of the fact that the data storage device is in a power-saving state, and a non-power-saving state indicative of the fact that the data storage device is not in a power-saving state. Also included in the interface are sampling means and disk status means. The sampling means samples the output signal of the disk sensor at three different moments that are predetermined in relation to each power-saving period of the power-saving signal. The disk status means ascertains a history of disk loading and unloading past each power-saving state of the power-saving signal on the basis of the three latest samples of the output signal of the disk sensor means.

In a preferred embodiment the disk sensor means is per se of the known type, producing an output signal that is correctly representative of disk presence or absence both when the power-saving signal is in the non-power-saving state and as long as no disk change is made during the power-saving state of the power-saving signal, but that, in the event of a change from one disk to another during the power-saving state of the power-saving signal, remains indicative of disk absence from the moment said one disk was unloaded to, at the earliest, the moment the power-saving signal subsequently gains a non-power-saving state.

Thus, preferably, the three sampling moments in question are approximately the beginning and end of each power-saving state, and very shortly after the beginning of the following non-power-saving state, of the power-saving signal. For example when all the three disk sensor output samples represent disk presence, the disk status means determines that the disk has been left loaded throughout the power-saving state. If, however, a disk was unloaded, and another loaded subsequently, during the power-saving period, then the first and the third samples will indicate disk presence, and the second sample disk absence.

The disk status means may include a memory for storing a disk status datum representative of such a disk loading and unloading history ascertained as above from the latest set of three disk sensor output samples. Constantly renewed with each power-saving state of the power-saving signal, the disk status datum is to be delivered to the processor on demand therefrom. It is to be appreciated that the third sampling moment comes earlier than the appearance of stepping pulses, so that the disk status datum is deliverable to the processor almost immediately upon resumption of the non-power-saving state.

The above and other objects, features and advantages of the invention and the manner of realizing them will become more apparent, and the invention itself will best be understood, from the following description taken together with the attached drawings showing the preferred embodiments of the invention.

DESCRIPTION OF THE PREFERRED EMBODIMENTS

Figure 1:
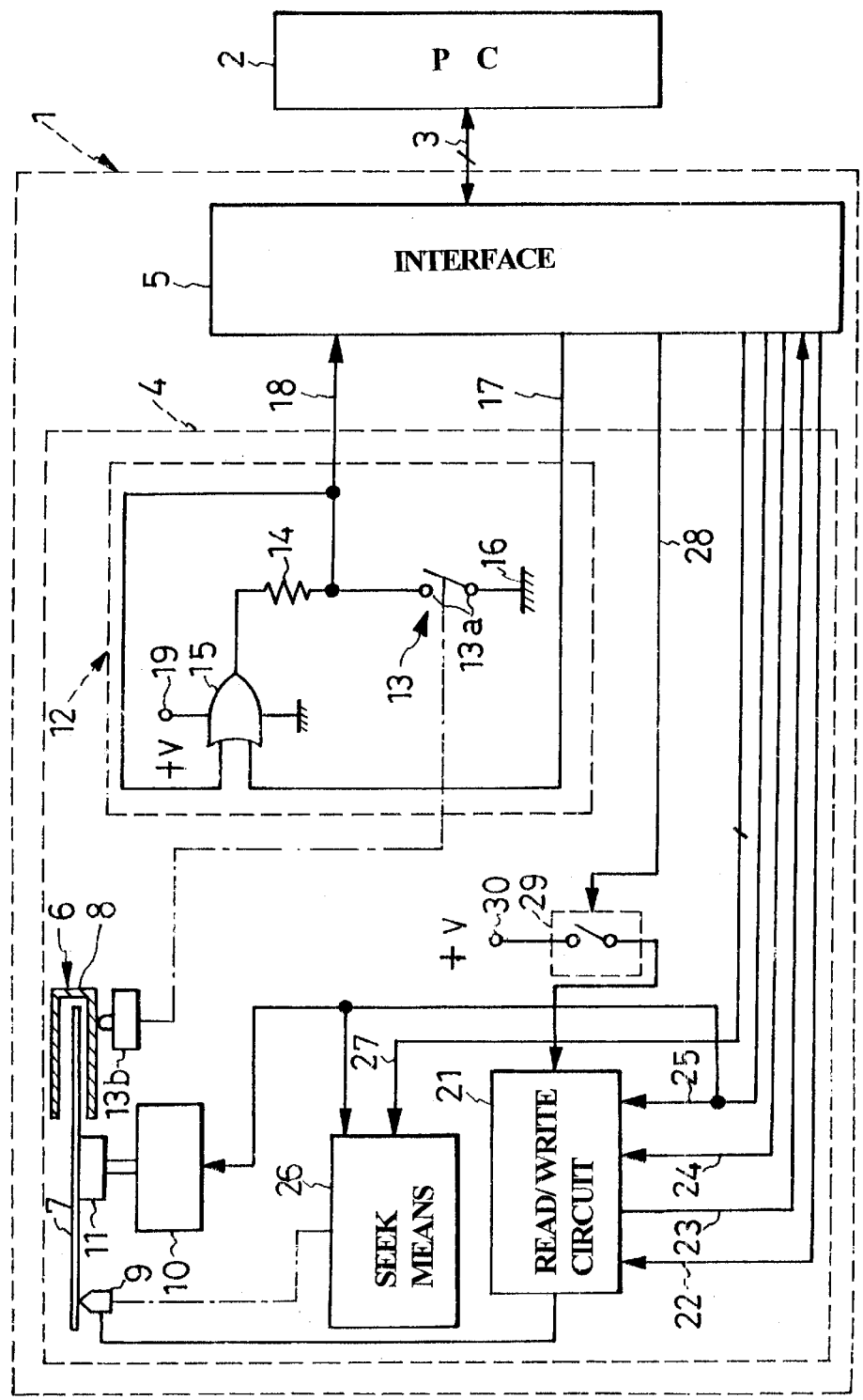
FIG. 1 is a schematic electrical diagram, partly in block form, of the rotating disk data storage system embodying the novel concepts of this invention.

The present invention will now be described in detail as embodied in an FDD with a built-in USB interface for use as a PC peripheral. FIG. 1 shows such a USB-FDD 1 connected to a PC 2 by way of a USB cable 3. The USB-FDD 1 is broadly divisible into an FDD proper (hereinafter referred to simply as FDD) 4 and a USB interface 5.

The FDD 4 is per se of largely conventional make, designed for use with a commercially available disk cartridge 6 having a three-and-a-half-inch magnetic data storage disk 7 rotatably housed in an envelope 8. The disk cartridge 6 is shown mounted in position on a turntable 11 which is driven directly by an electric drive motor 10. An electromagnetic transducer 9 travels across the data tracks on the disk 7 for writing and reading data thereon.

The reference numeral 12 generally denotes disk sensor means for sensing the loading and unloading of the disk cartridge 6 on and from the turntable 11. The disk sensor means 12 comprises a sensor switch 13, a pullup resistor 14, and an OR gate 15. The sensor switch 13 is a mechanical switch comprised of a pair of switch contacts 13a and a switch actuator 13b. The pair of switch contacts 13a are held closed when no disk cartridge is loaded on the turntable 11, and opened when the switch actuator 13b is depressed by the disk cartridge 6 positioned on the turntable.

One of the sensor switch contact pair 13a is connected via the resistor 14 to the output of the OR gate 15, and the other contact grounded. The OR gate 15 has one input connected to an output line 17 of the interface 5 over which there is supplied, as a power-saving signal, a MODIFIED DRIVE SELECT signal which is to be detailed subsequently. The other input of the OR gate 15 is connected to the junction between sensor switch 13 and resistor 14, that is, to the output line 18 of the disk sensor means 12. A feedback loop including the resistor 14 is thus formed.

Preferably, the OR gate 15 may take the form of a known integrated complementary metal-oxide semiconductor (CMOS) device incorporating an insulated-gate field-effect transistor, by virtue of its very low power requirement. A supply terminal 19 is connected to the OR gate 15 for driving the same. It is understood that the power thus fed to the OR gate 15 is free from the influence of the power-saving signal.

The transducer 9 is connected to a read/write circuit 21 of any known or suitable construction for causing the transducer to write data on the disk 7 and for reconstructing the data from the transducer output. Besides being connected to the transducer 9, the read/write circuit 21 is connected to the interface 5 by way of a WRITE DATA line 22, a READ DATA line 23, a WRITE GATE line 24, and a DRIVE SELECT line 25. The read/write circuit 21 is powered from a supply terminal 30 via a known power-saving switch 29. This switch is conventionally turned on and off by a power-saving signal fed from the interface 5 over a line 28.

Seek means 26 is mechanically coupled to the transducer 9 for moving the same in seek operations from track to track on the disk 7. Typically, the seek means includes an electric stepper motor, not shown, of known construction capable of bidirectional rotation by minute, discrete increments in response to stepping pulses and a stepping direction signal supplied from the interface 5. These two input signals are both shown to be delivered from interface 5 to seek means 26 over a line 27 for simplicity.

The disk drive motor 10 has connected thereto both the noted DRIVE SELECT line 25 and a MOTOR ON line, not shown. Unlike the showing of FIG. 1 the disk drive motor 10 and the seek means 26 could both be powered from this supply terminal 30 via the switch 29.

Before proceeding to the detailed description of the interface 5, to which the present invention is specifically directed the operation of the disk sensor means 12 will be briefly discussed, particularly in regard to what happens in the event of a disk change during a power saving period, in order to make easier an understanding of the subsequent description of the interface 5.

Figure 2:
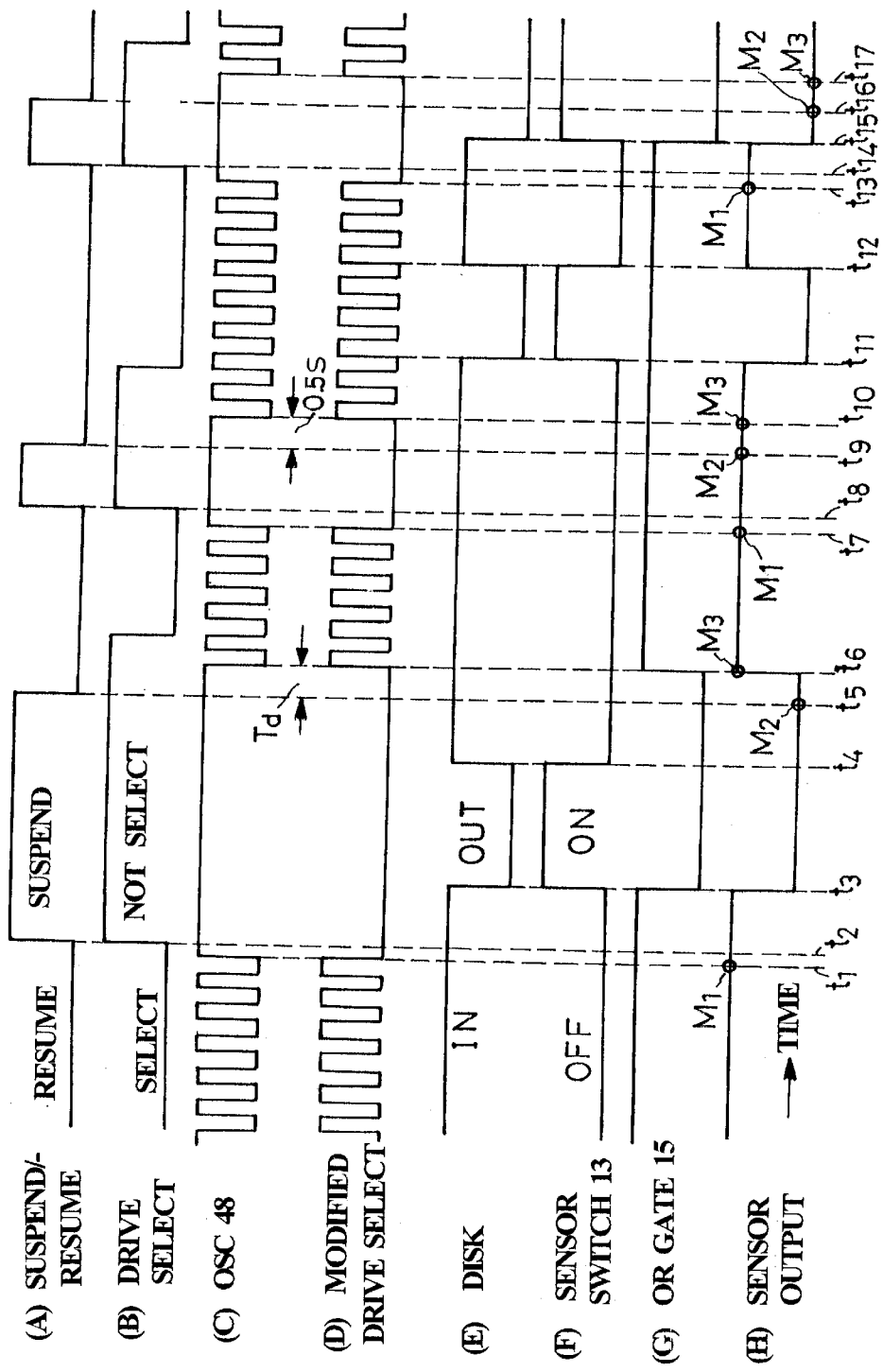
FIG. 2, consisting of (A) through (H), shows waveforms appearing in various parts of the FIG. 1 data storage system, the waveforms being useful in explaining operation.

At (D) in FIG. 2 is shown the aforesaid MODIFIED DRIVE SELECT signal supplied from the interface 5 to the OR gate 15 of the disk sensor means 12 over the line 17 for controlling its operation according to this invention. Derived from the SUSPEND/RESUME signal, shown at (A) in FIG. 2, in a manner yet to be described, the MODIFIED DRIVE SELECT signal is shown to be non-power-saving until $t_1$. If now a disk cartridge 6 is loaded on the turntable 11, as at (E) in FIG. 2, and the sensor switch 13 opened as a consequence, as at (F) in FIG. 2, then the sensor output line 18 will be high, indicating a logical "1", as at (H) in FIG. 2.

Since this sensor output is fed back to the OR gate 15, its output will also be high as at (G) in FIG. 2. There will therefore be no potential difference across the resistor 14, causing no current flow therethrough. The above noted states of the disk sensor components, indicated at (F), (G) and (H) in FIG. 2, will remain unaltered until the disk cartridge is ejected at $t_3$.

FIG. 2 is drawn on the assumption that the MODIFIED DRIVE SELECT signal from the interface 5 goes low at $t_1$, as at (D) in FIG. 2, whereas the SUSPEND/RESUME signal goes high, indicating suspension, at a slightly later moment $t_2$, as at (A) in FIG. 2. However, as at (H) in FIG. 2, the disk sensor output will remain high until $t_3$ when the disk cartridge is ejected. The sensor switch 13 will be closed upon this disk cartridge ejection at $t_3$ in the middle of the $t_2$–$t_5$ period during which the SUSPEND/RESUME signal indicates suspension. The sensor output line 18 will go low upon closure of the sensor switch 13. Since then both inputs to the OR gate 15 will be low, so will be its output, as at (G) in FIG. 2.

Here again there will thus be no potential difference across the resistor 14. No current will flow therethrough, causing no power loss.

Let us suppose that a disk cartridge is reloaded at $t_4$, as at (E) in FIG. 2, still in the middle of the $t_2$–$t_5$ period when the SUSPEND/RESUME signal indicates suspension. The sensor switch 13 will be reopened as at (F) in FIG. 2. The OR gate 15 has already been low, however, and this low output fed back to one of its inputs, so that the OR gate 15 will remain low after $t_4$, as at (G) in FIG. 2. The sensor output will therefore also remain low in the face of the reloading of the disk cartridge, as at (H) in FIG. 2.

The MODIFIED DRIVE SELECT signal is shown at (D) in FIG. 2 to go high at $t_6$, shortly after $t_5$ when the SUSPEND/RESUME signal goes low to indicate resumption. The disk cartridge is still held loaded at $t_6$, holding the sensor switch 13 open. The OR gate 15 will go high at $t_6$, as at (G) in FIG. 2, and so will the sensor output line 18 as at (H) in FIG. 2.

This high output from the disk sensor means 12 correctly indicates that there is a disk cartridge loaded on the turntable 11 at the moment of $t_6$, but not whether this cartridge is the same as the one that was loaded before $t_5$ or is a different one that was reloaded in the course of the $t_2$–$t_6$ SUSPEND state, as at $t_4$, of the SUSPEND/RESUME signal, that is, not whether a disk change has been made during that SUSPEND period. The interface 5 according to the present invention is well equipped to distinguish between these two possible cases, accurately discerning the occurrence, as in this case, or nonoccurrence of a disk change during each SUSPEND period. Additionally, the interface 5 according to the invention is enabled to ascertain any of such possible histories of disk loading and unloading immediately when the SUSPEND/RESUME signal regains a RESUME state, as at $t_5$ in FIG. 2, without waiting for the appearance of stepping pulses.

With the above described construction and operation of the disk sensor means 12 in mind, let us now examine the construction of the improved USB interface 5 incorporating the novel concepts of this invention. As depicted rather functionally in FIG. 3, the interface 5 is notionally divisible into a main network 31 of largely standard design including a central processor unit, not shown, and an additional, sensor-related network 32 from which the MODIFIED DRIVE SELECT signal is supplied to the disk sensor means 12, FIG. 1, over the line 17 and to which the output from the disk sensor means is delivered over the line 18.

Figure 4:
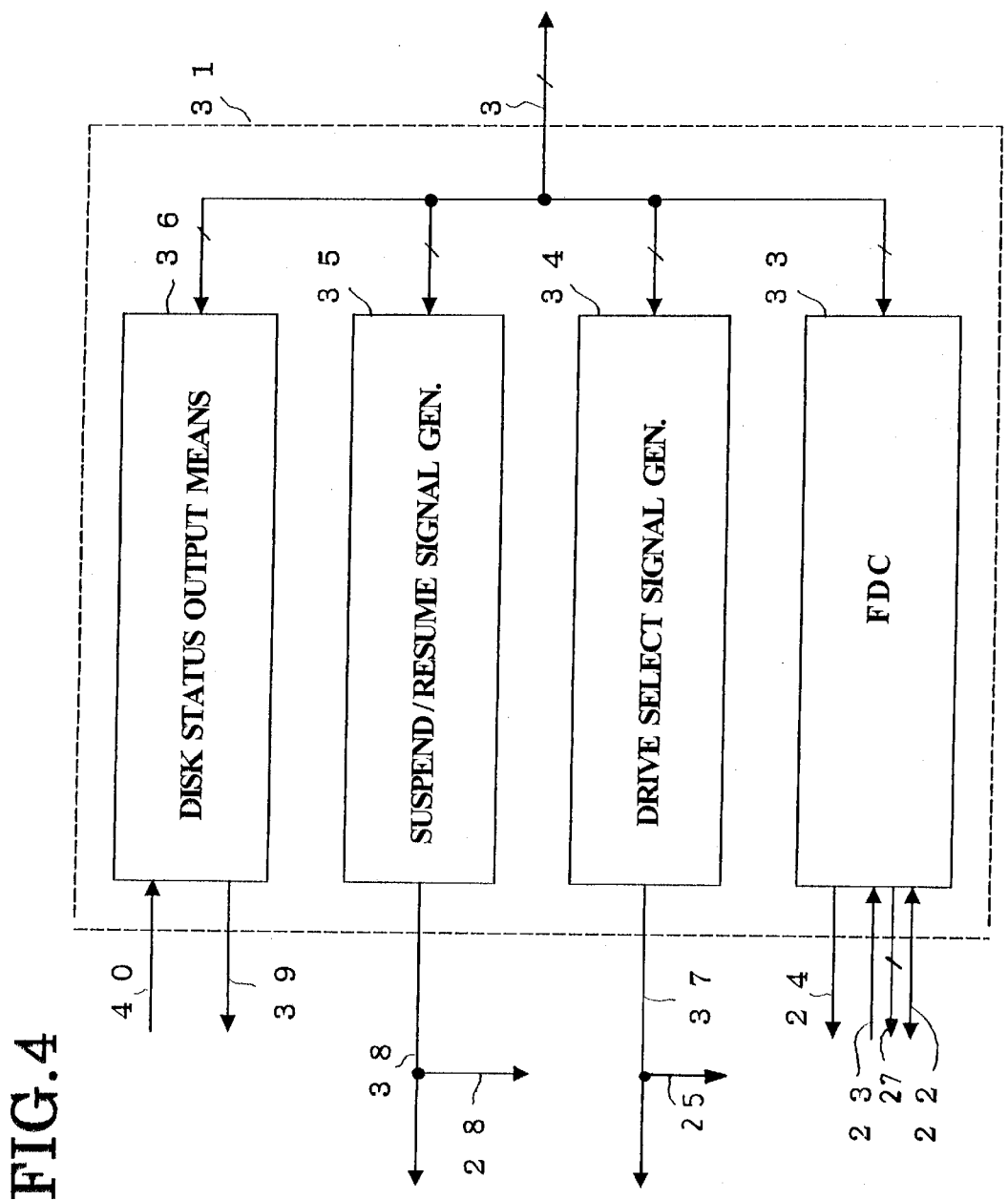
FIG. 4 is a block diagram showing in detail the main network of the interface of the FIG. 1 data storage system.

As shown block-diagrammatically in FIG. 4, the main interface network 31 may be considered to comprise, as far as the instant invention is concerned, an FDD controller (FDC) 33, DRIVE SELECT signal generator means 34, SUSPEND/RESUME signal generator means 35, and DISK STATUS output means 36, all connected to the PC 2, FIG. 1, by way of the USB cable 3 for data transfer therewith. A brief explanation of these components of the main interface network 31 follows.

In response to commands from the PC 2, the FDC 33 delivers a WRITE DATA signal and a WRITE GATE signal to the read/write circuit 21, FIG. 1, of the FDD 4 over lines 22 and 24 in order to cause the FDD to write the data on the disk 7. Also, as the FDD 4 reads the disk 7, the FDC 33 receives the READ DATA signal from the read/write circuit 21 over the line 23. Many other standard functions performed by the FDC 33 fall outside the purview of this invention.

Shown aside from the FDC 33 for the ease of understanding, the DRIVE SELECT signal generator means 34 decodes the data transfer command from the PC 2 and puts out a corresponding DRIVE SELECT signal, shown at (B) in FIG. 2, on its output line 37. The DRIVE SELECT signal is shown to have a low, SELECT state, standing for the execution of data transfer in the FDD concerned, and a high, NOT SELECT state indicating non-execution. The DRIVE SELECT signal is fed into the sensor-related interface network 32, FIG. 3 as well as into the FDD 4, FIG. 1, over a line 37.

The SUSPEND/RESUME signal generator means 35 responds to both suspend and resume commands from the PC 2 and puts out the SUSPEND/RESUME signal, FIG. 2(A), on a line 38 for power saving purposes. It is understood that when the SUSPEND/RESUME signal is in a high, SUSPEND state, the complete USB-FDD 1 (both FDD 4 and USB interface 5) is asleep, inactive, or in a power-saving state. When the SUSPEND/RESUME signal is in a low, RESUME state, on the other hand, at least the USB interface 5 is awake, active, or in a non-power-saving state. The FDD 4 may then be active or inactive depending upon the state of the DRIVE SELECT signal; specifically, the FDD is in a power-saving state when the DRIVE SELECT signal is in a NOT SELECT state. A comparison of (A) and (B) in FIG. 2 will reveal that the DRIVE SELECT signal goes into a SELECT state with some delay after the SUSPEND/RESUME signal as the power-saving signal gains a RESUME state.

Figure 3:
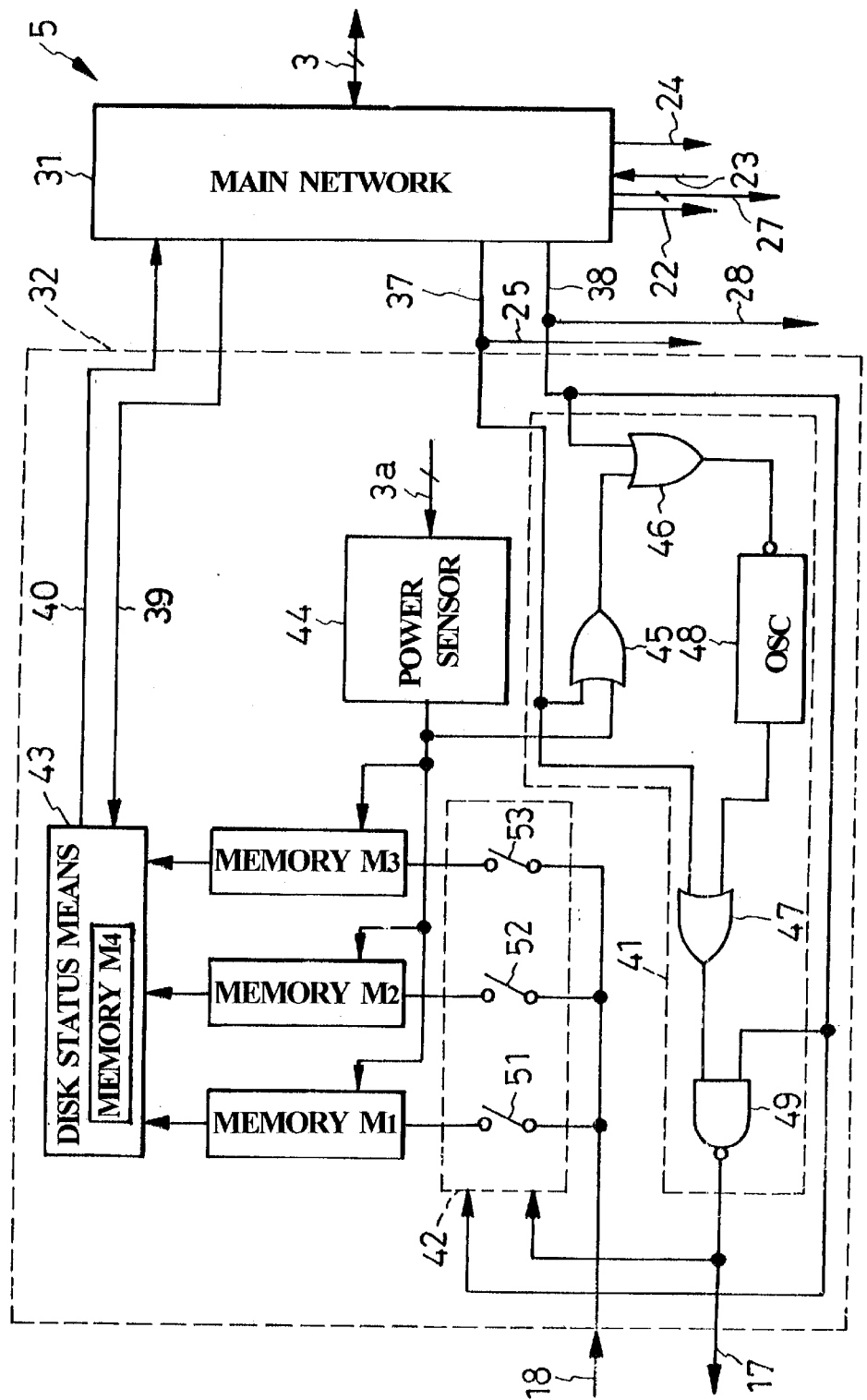
FIG. 3 is a block diagram showing in detail the interface, particularly the sensor-related network thereof, of the FIG. 1 data storage system.

The DISK STATUS output means 36 decodes a DISK STATUS QUERY signal sent from the PC 2 and forwards it to the sensor-related interface network 32, FIG. 3, over a line 39. The sensor-related network 32 will then respond, in a manner yet to be described, by sending back over a line 40 a DISK STATUS REPORT signal indicative of a history of disk loading and unloading past each SUSPEND state that has been imposed on the FDD 4. The DISK STATUS REPORT signal will then be forwarded from the main interface network 31 to the PC 2 as the processor over the bus 3.

Reference is now directed back to FIG. 3 for a detailed study of the sensor-related network 32 of the USB interface 5. This sensor-related interface network 32 comprises: (a) a MODIFIED DRIVE SELECT signal generator circuit 41; (b) three sample memories $M_1$, $M_2$ and $M_3$ for storing disk sensor output samples at prescribed moments; (c) sampling means 42 for sampling the disk sensor output at prescribed moments and selectively directing the samples into the sample memories $M_1$–$M_3$; (d) DISK STATUS means 43 including a DISK STATUS memory $M_4$ for storing a renewable DISK STATUS datum compiled from the disk sensor output samples stored on the sample memories $M_1$–$M_3$, for delivery to the main interface network 31 as the DISK STATUS REPORT signal; and (e) power sensor means 44 for sensing the delivery of power over the power conductors 3a included in the USB cable 3.

The MODIFIED DRIVE SELECT signal is sent from the generator circuit 41 to the OR gate 15, FIG. 1, of the disk sensor means 12 over the line 17. Also, inputting the disk sensor output over the line 18, the sensor-related interface network 32 generates the DISK STATUS REPORT signal, as above, for delivery to the DISK STATUS output means 36, FIG. 4, of the main interface network 31 over the line 40.

The MODIFIED DRIVE SELECT signal generator circuit 41 comprises three OR gates 45, 46 and 47, a pulse generator or oscillator (OSC) circuit 48, and a NAND gate 49. The first OR gate 45 has one input connected to the DRIVE SELECT signal line 37, and the other input to the power sensor means 44. On sensing the commencement of power delivery over the cable 3, the power sensor means 44 will deliver a resetting pulse to the three memories $M_1$–$M_3$ and the OSC circuit 48, which thereupon will all be initialized.

The second OR gate 46 has one input connected to the SUSPEND/RESUME signal line 38, and the other input to the first OR gate 45. The output of the second OR gate 46 is connected to the OSC circuit 48.

Including a timer, the OSC circuit 48 generates "negative" pulses at intervals of half a second, as at (C) in FIG. 2, in response to the RESUME state of the SUSPEND/RESUME signal, FIG. 2(A), and to the SELECT state of the DRIVE SELECT signal, FIG. 2(B). It will be noted from (A) and (C) in FIG. 2 that the each first "negative" output pulse of the OSC circuit 48 has a time delay Td (e.g. half a second) from the beginning of one RESUME state of the SUSPEND/RESUME signal.

The third OR gate 47 has one input connected to the DRIVE SELECT signal line 37, and the other input to the OSC circuit 48. The output from this third OR gate 47 is therefore equivalent to the FIG. 4(C) output from the OSC circuit 48. Further, even if the OSC circuit 48 somehow fails to provide the "negative" pulses, the DRIVE SELECT signal on the line 37 can be sent on to the NAND gate 49.

The NAND gate 49 has one input connected to the third OR gate 47, and the other input to the SUSPEND/RESUME signal line 38. Therefore, as indicated at (D) in FIG. 2, the NAND gate 49 puts out a series of pulses at half a second Intervals during each RESUME state of the SUSPEND/RESUME signal. The each first "positive" output pulse of the NAND gate 49 has a time delay Td ( e.g. half a second ) from the beginning of one RESUME state of the SUSPEND/RESUME signal. This output from the NAND gate 49 is fed as the MODIFIED DRIVE SELECT signal to the OR gate 15, FIG. 1, of the disk sensor means 12 over the line 17, as well as to the sampling means 42 of this sensor-related USB network 32. The NAND gate output could be alternatively called the MODIFIED SUSPEND/RESUME signal or, as contrasted with the external DRIVE SELECT signal supplied from the PC 2 via the main interface network 31, the INTERNAL DRIVE SELECT signal.

Having three switches 51, 52 and 53 connected respectively between the disk sensor output line 18 and the sample memories $M_1$–$M_3$, the sampling means 42 functions to sample the disk sensor output and apportion the samples to these memories. The switches 51–53 are under the control of both SUSPEND/RESUME signal on the main interface network output line 38 and MODIFIED DRIVE SELECT signal on the NAND gate output line 17, for sampling the disk sensor output at prescribed moments in time. The sampling means 42 is understood to include a decoder, not shown, for production of switch control signals by decoding the SUSPEND/RESUME and MODIFIED DRIVE SELECT signals, in a manner set forth in the following.

The first sampling switch 51 is closed, causing a disk sensor output sample to be written on the first sample memory $M_1$, when the SUSPEND/RESUME signal is in a RESUME state and, at the same time, when the MODIFIED DRIVE SELECT signal is low, indicating data transfer. The disk sensor output is therefore sampled as at $t_1$, $t_7$ and $t_{13}$ in FIG. 2. (For the ease of understanding the sample memories $M_1$–$M_3$ on which the disk sensor output samples are to be stored are indicated at the specified moments at (H) in FIG. 2.) The first sample memory $M_1$ is intended to hold the disk sensor output level immediately before each SUSPEND period of the SUSPEND/RESUME signal. The $t_1$–$t_2$, $t_7$–$t_8$ and $t_{13}$–$t_{14}$ time intervals immediately preceding the SUSPEND periods in FIG. 2 may be from about 0.1 to about 3.0 seconds. Namely, the first sample memory $M_1$ is intended to store the disk sensor output between the end of the select state of the MODIFIED DRIVE SELECT signal and the end of the RESUME period.

The second sampling switch 52 is closed, causing a disk sensor output sample to be written on the second sample memory $M_2$, when the SUSPEND/RESUME signal indicates the ending of each SUSPEND period, or the beginning of a RESUME period, and, at the same time, when the MODIFIED DRIVE SELECT signal is in a NOT SELECT state. The disk sensor output is sampled as at $t_5$, $t_9$ and $t_{15}$ in this case. Namely, the second sample memory $M_2$ is intended to store the disk sensor output between the end of the SUSPEND period and the end of the NOT SELECT state of the MODIFIED DRIVE SELECT signal.

The third sampling switch 53 is closed, causing a disk sensor output sample to be written on the third sample memory $M_3$, when the MODIFIED DRIVE SELECT signal terminates a NOT SELECT state during a RESUME period of the SUSPEND/RESUME signal, as at $t_5$, $t_{10}$ and $t_{17}$.

Referring to the disk sensor output samples stored, on all the three sample memories $M_1$–$M_3$, the DISK STATUS means 43 creates, and stores on its memory $M_4$, any one of an assortment of DISK STATUS data representative of six possible histories of disk cartridge loading and unloading in relation to the two possible states of the SUSPEND/RESUME signal. The DISK STATUS datum stored on the memory $M_4$ is to be delivered as the DISK STATUS REPORT signal to the main interface network 31, and thence to the PC 2, on demand therefrom.

The disk sensor output samples, which simply represent the presence or absence of a disk cartridge on the turntable 11 at the respective moments of sampling, may be stored on the sample memories $M_1$–$M_3$ in either of the following possible combinations as the disk sensor output Is sampled at the moments specified above and indicated at (H) in FIG. 2.

1. When the disk sensor output samples on all the three sample memories $M_1$–$M_3$ indicate disk presence:

The disk cartridge had been left loaded in the FDD 4 throughout the SUSPEND (power saving) period and still is in the RESUME period in this case. A first DISK STATUS datum indicative of that fact is therefore stored on the DISK STATUS memory $M_4$. This case is shown to occur in FIG. 2 from $t_7$ to $t_{10}$. A SUSPEND period $t_8$–$t_9$ is contained in the $t_7$–$t_{10}$ interval. Since the disk cartridge had been left loaded throughout this interval, as at (E) in FIG. 2, the disk sensor output samples on the sample memories $M_1$–$M_3$ will all represent disk presence, having been taken at $t_7$, $t_9$ and $t_{10}$. The position of the transducer 9 with respect to the disk 7 remains unchanged when it is left untouched during a SUSPEND period. As a result, upon commencement of the ensuing RESUME period, the data transfer can be started immediately without need for initializing and repositioning the transducer.

2. When the disk sensor output samples on the first two sample memories $M_1$ and $M_2$ indicate disk presence, and the disk sensor output sample on the third sample memory $M_3$ disk absence:

The disk cartridge has been unloaded immediately after the start of the RESUME period. A second DISK STATUS datum is stored on the DISK STATUS memory $M_4$ to represent that fact.

3. When the disk sensor output sample on the first sample memory $M_1$ indicates disk presence, and the samples on the other two sample memories $M_2$ and $M_3$ disk absence:

The disk cartridge was unloaded during the SUSPEND period and still is in the RESUME period. A third DISK STATUS datum to that effect is stored on the DISK STATUS memory $M_4$. This case is shown to occur from $t_{13}$ to $t_{17}$ in FIG. 2. The disk sensor output samples at $t_{13}$, $t_{16}$ and $t_{17}$ are stored on the sample memories $M_1$–$M_3$.

4. When the disk sensor output samples on all the sample memories $M_1$–$M_3$ indicate disk absence:

No disk cartridge has been loaded from the beginning. A fourth DISK STATUS datum to that effect is stored on the DISK STATUS memory $M_4$.

5. When the disk sensor output samples on the first and third sample memories $M_1$ and $M_3$ indicate disk presence, and the sample on the second sample memory $M_2$ disk presence:

The disk cartridge was unloaded, and another cartridge (not necessarily different one) reloaded, during the SUSPEND period. A fifth DISK STATUS datum to that effect is stored on the DISK STATUS memory $M_4$. Such a disk change is shown to occur from $t_3$ to $t_4$ in FIG. 2, during the $t_2$–$t_5$ SUSPEND period of the SUSPEND/RESUME signal. The disk sensor output was first sampled for storage on the first sample memory $M_1$ at $t_1$, immediately before the $t_2$–$t_5$ SUSPEND period. Then, although a disk change occurred from $t_3$ to $t_4$, the disk sensor output sample indicative of disk absence was stored on the second sample memory $M_2$ at $t_5$ when the SUSPEND period ends and the RESUME period begins. Then the disk sensor output sample indicative of disk presence was stored on the third sample memory $M_3$ at $t_6$ when the MODIFIED DRIVE SELECT signal terminates the NOT SELECT state very shortly after the termination of the SUSPEND state at $t_5$. These disk sensor output samples on the sample memories $M_1$–$M_3$ evidence in combination that a disk change occurred during the SUSPEND period. In this case, unlike the first described case, the transducer 9 must be initialized on Track Zero on the disk 7 for subsequent positioning on a desired track position upon commencement of the RESUME period.

6. When the disk sensor output samples on the first and second sample memories $M_1$ and $M_2$ indicate disk absence, and the sample on the third sample memory $M_3$ disk presence:

No disk cartridge had been loaded, but one was loaded during the SUSPEND period and still is. A sixth DISK STATUS datum to that effect is stored on the DISK STATUS memory $M_4$.

The DISK STATUS means 43 is not shown in detail because it is considered easy for the electronics specialists to devise logic circuitry for production of the foregoing six DISK STATUS data uniquely indicative of all the possible histories of disk loading and unloading before, during, and after each SUSPEND period. The disk sensor output samples may be stored as either logical ONE or ZERO on the memories $M_1$–$M_3$, and the binary digital outputs from these memories directed through the logic circuitry.

Whenever questioned by the DISK STATUS QUERY signal forwarded from the DISK STATUS output means 36, FIG. 4, of the main interface network 31 over the line 39, the DISK STATUS means 43 will send any one of the six possible DISK STATUS data that is then stored on its DISK STATUS memory $M_4$, to the main interface network over the line 40 as the DISK STATUS REPORT signal and thence to the PC 2, FIG. 1, over the bus 3. The contents of the DISK STATUS memory $M_4$ are renewed with each SUSPEND period, so that only the latest DISK STATUS datum will be sent to the PC 2.

As a particular feature of the above described embodiment of the invention, the disk sensor output is sampled, for storage on the third sample memory $M_3$, in response to the MODIFIED DRIVE SELECT signal immediately after the beginning of each RESUME state of the SUSPEND/RESUME signal. The PC 2 is therefore informed of the history of disk loading and unloading just after the start of each RESUME period for quick start of data transfer.

Second Form

Figure 5:
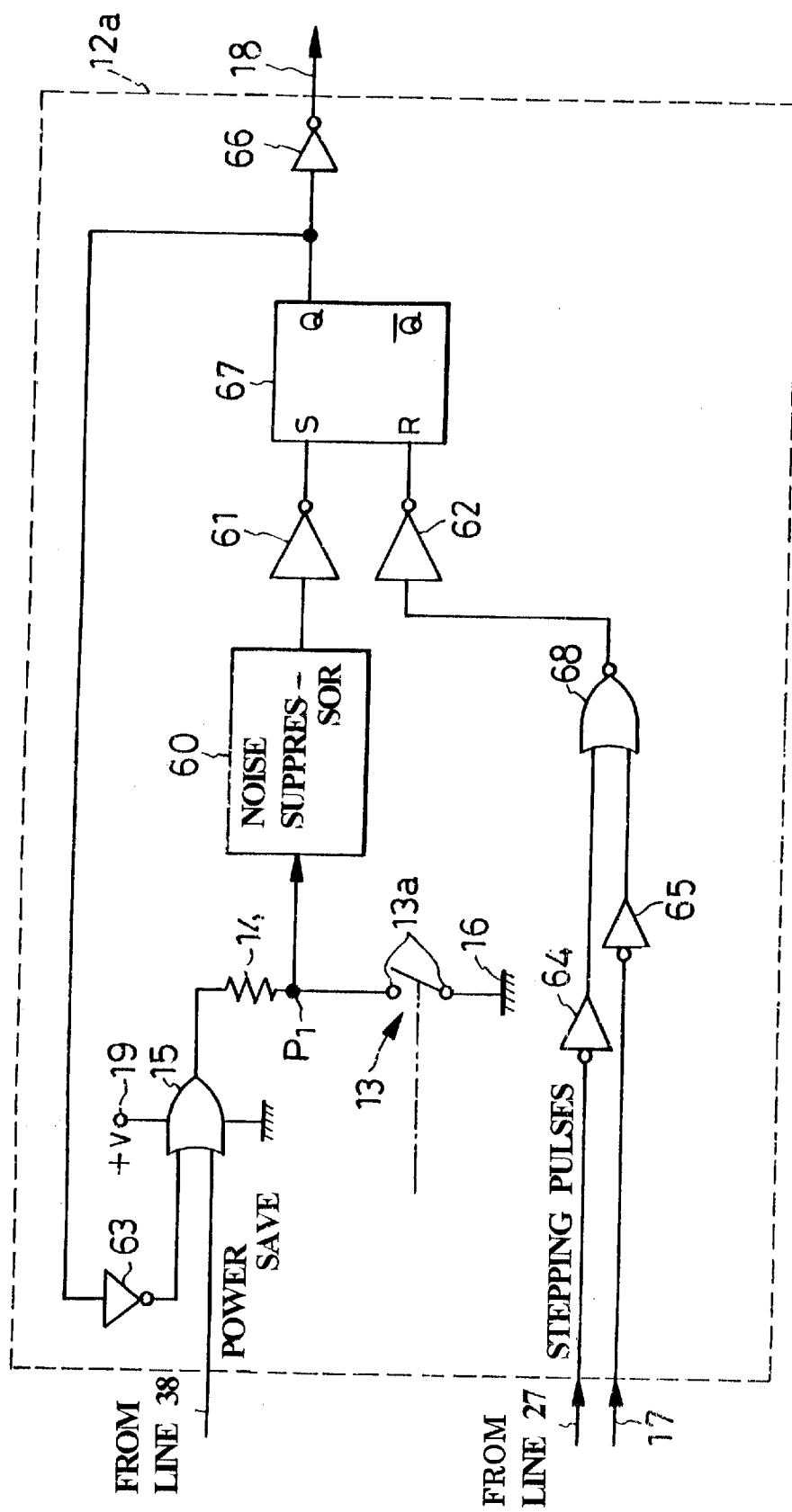
FIG. 5 is a schematic electrical diagram of modified disk sensor means according to the invention.

The disk sensor means 12, FIG. 1, of the foregoing embodiment of the invention is modifiable as diagramed in FIG. 5 and therein generally designated 12a. The modified disk sensor means 12a comprises a noise suppressor circuit 60, six NOT circuits 61–66, an RS (reset-set) flip-flop 67 with priority to setting, and a NOR gate 68, in addition to those included in the first disclosed sensor means 12, which are identified by the same reference characters as used in FIG. 1.

Having an input connected to the junction P1 between the sensor switch 13 and the resistor 14, the noise suppressor circuit 60 functions to eliminate spurious voltage fluctuations that may be contained in the output from the sensor switch. A similarly functioning noise suppressor circuit is disclosed in the above cross-referenced U.S. Pat. No. 5,400, 190.

The noise suppressor circuit 60 has its output connected via the NOT circuit 61 to the set input S of the flip--flop 67. The Q output of this flip-flop is connected via the NOT circuit 63 to one input of the OR gate 15, the other input of which is connected to the SUSPEND/RESUME signal line 38, FIG. 3. The Q output of the flip flop 67 is also connected via the NOT circuit 66 to the sensor output line 18 leading to the sampling means 42, FIG. 3.

The flip-flop 67 has its reset input R connected via the NOT circuit 62 to the NOR gate 68, to one input of which is connected the stepping pulse line 27, FIG. 1, from the interface 5 via the NOT circuit 64. The other input of the NOR gate 68 is connected via the NOT circuit 65 to the MODIFIED DRIVE SELECT signal line 17, FIG. 3, from the interface 32. Thus the NOR gate 66 will go low, resetting the flip-flop 67 via the NOT circuit 62, in response to the MODIFIED. DRIVE SELECT signal, FIG. 4(D), or to the stepping pulses.

In FDDs of prior art construction, an equivalent of the flip flop 67 was reset only when the DRIVE SELECT signal is TRUE and, at the same time, when stepping pulses are incoming. By contrast, in the improved FDD of this invention incorporating the modified disk sensor means 12a, the flip flop 67 can be reset solely by the MODIFIED DRIVE SELECT signal after the SUSPEND/RESUME signal has gained a RESUME state.

Figure 6:
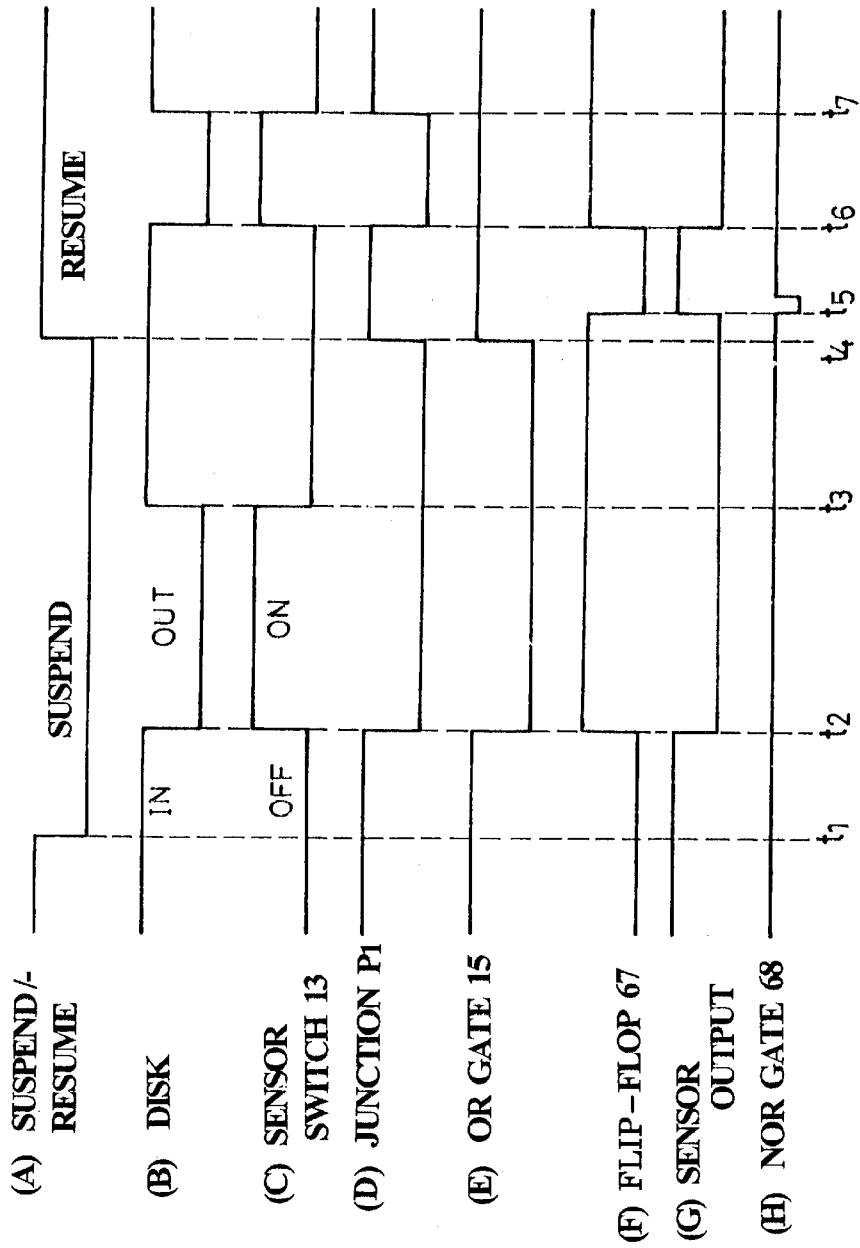
FIG. 6, consisting of (A) through (H), shows waveforms useful in explaining the operation of the FIG. 5 disk sensor means.

The operational features of the modified disk sensor means 12a will be understood by referring to the timing diagram of FIG. 6. Since the MODIFIED DRIVE SELECT signal is being produced on the line 17 during each RESUME state of the FIG. 6(A) SUSPEND/RESUME signal, as has been mentioned in conjunction with (A) and (D) in FIG. 2, the flip-flop 67 of the modified disk sensor means 12a is low at $t_1$, as at (F) in FIG. 6. Inverted by the NOT circuit 63, this flip-flop output is impressed to one Input of the OR gate 15, holding the same high until $t_2$ when the disk is withdrawn as at (B) in FIG. 6. No current will flow through the resistor 14 until $t_4$. Operation after during the RESUME period after $t_4$ is the same as in the previous embodiment.

As indicated at (G) in FIG. 6, the modified disk sensor means 12a provides an output signal similar to that of the first disclosed disk sensor means 12 shown at (H) in FIG. 2. The history of disk loading and unloading past each SUSPEND state of the SUSPEND/RESUME signal is therefore ascertainable by the sensor-related interface network 32, FIG. 3. Additionally, the modified disk sensor means 12a responds to stepping pulses as well. If a stepping pulse is input earlier than the MODIFIED DRIVE SELECT signal, a possible disk change during each SUSPEND period will be detected even earlier upon commencement of the following RESUME period. Operating errors will also lessen thanks to the noise suppressor circuit 60.

Possible Modifications

Despite the foregoing detailed disclosure it is not desired that the present invention be limited by the exact showings of the drawings or by the description thereof. The following is a brief list of possible modifications, alterations and adaptations of the illustrated embodiments which are all believed to fall within the scope of the invention:

1. A noise suppressor circuit could be inserted in the FIG. 1 disk sensor means 12 as well.

2. The disk sensor output signal could be low to represent disk presence.

3. The SUSPEND/RESUME and DRIVE SELECT signals could be high to represent RESUME and SELECT, respectively.

4. The time delay Td, FIG. 2, from the beginning of each RESUME state of the SUSPEND/RESUME signal to the first pulse of the MODIFIED DRIVE SELECT signal could be variously determined in a range of 0.1 through 3.0 seconds. Generally, this delay Td should be as short as possible provided that no confusion occurs in sampling the disk sensor output signal as at $t_5$ and $t_6$ in FIG. 2 for storage of the samples in the sample memories $M_2$ and $M_3$, FIG. 3.

5. The DRIVE SELECT signal, FIG. 2(B), could take the form of pulses during the SELECT period.

6. The present invention may be applied to a variety of rotating disk data storage devices other than the FDD.

What is claimed is:

1. A rotating disk data storage system operating under the control of a processor, comprising:
   (A) a data storage device comprising:
      (a) a transducer for data transfer with a rotating data storage disk being held in a preassigned position; and
      (b) disk sensor means for providing an output signal indicative of whether a data storage disk is in the preassigned position or not; and
   (B) an interface for connecting the data storage device to a processor, the interface comprising:
      (a) power-saving means for generating a power-saving signal under the direction of the processor, the power-saving signal having a power-saving state, indicative of the fact that the data storage device is in a power-saving state, and a non-power-saving state indicative of the fact that the data storage device is not in a power-saving state;
      (b) sampling means connected to the disk sensor means and to the power-saving means for sampling the output signal of the disk sensor means at three different moments that are predetermined in relation to each power-saving state of the power-saving signal; and
      (c) disk status means connected to the sampling means for ascertaining a history of disk loading and unloading past each power-saving state of the power-saving signal on the basis of the three samples of the output signal of the disk sensor means.

2. The rotating disk data storage system of claim 1 wherein the sampling means of the interface comprises:
   (a) a set of sampling switches connected to the disk sensor means; and
   (b) sample memory means connected to the sampling switches for storing the samples of the output signal of the disk sensor means.

3. The rotating disk data storage system of claim 2 wherein the disk status means of the interface comprises a disk status memory for storing a renewable disk status datum, compiled from the samples stored on the sample memory means of the sampling means, representative of a history of disk loading and unloading past each power-saving state of the power-saving signal.

4. The rotating disk data storage system of claim 1 wherein the three predetermined sampling moments are approximately the beginning and end of each power-saving state, and a moment during an ensuing non-power-saving state, of the power saving signal.

5. A rotating disk data storage system operating under the control of a processor, comprising:
   (A) a data storage device comprising:
      (a) a transducer for data transfer with a rotating data storage disk being held in a preassigned position; and
      (b) disk sensor means for providing an output signal indicative of whether a data storage disk is in the preassigned position or not; and
   (B) an interface for connecting the data storage device to a processor, the interface comprising:
      (a) power-saving means for generating a power-saving signal under the direction of the processor, the power-saving signal having a power-saving state, indicative of the fact that the data storage device is in a power-saving state, and a non-power-saving state indicative of the fact that the data storage device is not in a power-saving state;
      (b) drive select means for generating a drive select signal under the direction of the processor, the drive select signal having a select state, indicative of the fact that the data storage device is chosen for data transfer with the rotating data storage disk, and a not-select state indicative of the fact that the data storage device is not, the select state of the drive select signal beginning after the beginning of each non-power-saving state of the power-saving signal;

(c) sampling means connected to the disk sensor means and the power-saving means and the drive select means for sampling the output signal of the disk sensor means at a plurality of different moments that are predetermined in relation to each power-saving state of the power-saving signal, the predetermined moments including a first moment approximately at the beginning of each power-saving state of the power-saving signal, a second moment approximately at the end of each power-saving state of the power-saving signal, and a third moment approximately at the beginning of each select state of the drive select signal; and (d) disk status means connected to the sampling means for ascertaining a history of disk loading and unloading past each power-saving state of the power-saving signal on the basis of the three samples of the output signal of the disk sensor means.

6. The rotating disk data storage system of claim 5 wherein the disk sensor means of the data storage device comprises:

(a) a logic circuit having a first and a second input for providing an output representative of a logical sum of the two inputs, the first input being connected to the drive select means of the interface for inputting the drive select signal;

(b) a resistor having one extremity connected to the output of the logic circuit; and (c) a sensor switch connected between another extremity of the resistor and ground and adapted to be opened when a data storage disk is in the preassigned position, and closed when a data storage disk is not, the junction between the sensor switch and the resistor being connected to the second input of the logic circuit.

7. The rotating disk data storage system of claim 5 wherein the data storage device further comprises seek means for positioning the transducer in a desired track position on the data storage disk, and stepping pulse supply means for supplying stepping pulses from the interface to the seek means, and wherein disk sensor means of the data storage device comprises:

(a) a logic circuit having a first and a second input for providing an output representative of a logical sum of the two inputs, the first input being connected to the power-saving means of the interface for inputting the power-saving signal;

(b) a resistor having one extremity connected to the output of the logic circuit;

(c) a sensor switch connected between another extremity of the resistor and ground and adapted to be opened when a data storage disk is in the preassigned position, and closed when a data storage disk is not;

(d) a flip-flop having a set input connected to a junction between the sensor switch and the resistor, a reset input, and an output connected to the second input of the logic circuit; and (e) reset means connected to the reset input of the flip-flop for resetting the same in response to either of the drive select signal and the stepping pulses.

8. The rotating disk data storage system of claim 7 wherein the disk sensor means of the data storage device further comprises a noise suppressor circuit connected between the junction between the sensor switch and the resistor and the set input of the flip-flop.

9. A rotating disk data storage system operating under the control of a processor, comprising:

(A) a data storage device comprising:
(a) a transducer for data transfer with a rotating data storage disk being held in a preassigned position; and
(b) disk sensor means for providing an output signal indicative of whether a data storage disk is in the preassigned position or not; and (B) an interface for connecting the data storage device to a processor, the interface comprising:
(a) power-saving means for generating a power-saving signal under the direction of the processor, the power-saving signal having a power-saving state, indicative of the fact that the data storage device is in a power-saving state, and a non-power-saving state indicative of the fact that the data storage device is not in a power-saving state;
(b) the output signal of the disk sensor means of the data storage device being correctly representative of disk presence or absence both when the power-saving signal is in the non-power-saving state and as long as no disk change is made during the power-saving state of the power-saving signal, and, in the event of a change from one disk to another during the power-saving state of the power-saving signal, being indicative of disk absence from the moment said one disk was unloaded to, at the earliest, the moment the power-saving signal subsequently gains a non-power-saving state;
(c) drive select means for generating a drive select signal under the direction of the processor, the drive select signal having a select state, indicative of the fact that the data storage device is chosen for data transfer with the rotating data storage disk, and a not-select state indicative of the fact that the data storage device is not the select state of the drive select signal beginning after the beginning of each non-power-saving state of the power-saving signal;
(d) first sample memory means connected to the disk sensor means for storing a sample of the output signal thereof at the end of each non-power-saving state of the power-saving signal at the latest;
(e) second sample memory means connected to the disk sensor means for storing a sample of the output signal thereof at the end of each power-saving state of the power-saving signal at the earliest;
(f) third sample memory means connected to the disk sensor means for storing a sample of the output signal thereof at the beginning of the select state of the drive select signal; and
(g) disk status means connected to the first, the second and the third sample memory means for ascertaining a history of disk loading and unloading past each power-saving state of the power-saving signal on the basis of the three samples of the output signal of the disk sensor means stored on the sample memory means.

10. The rotating disk data storage system of claim 9 wherein the disk status means of the interface produces:
(a) a first disk status datum, indicative of the fact that a disk has been left loaded throughout the power-saving period, when the disk sensor output samples on all the sample memory means indicate disk presence;
(b) a second disk status datum, indicative of the fact that a disk has been unloaded after the start of the nonpower-saving period, when the disk sensor output samples on the first and the second sample memory means indicate disk presence and, at the same time, when the disk sensor output sample on the third sample memory means indicates disk absence;

(c) a third disk status datum, indicative of the fact that a disk has been unloaded during the power-saving period, when the disk sensor output sample on the first sample memory means indicates disk presence and, at the same time, when the disk sensor output samples on the second and the third sample memory means indicate disk absence;

(d) a fourth disk status datum, indicative of the fact that no disk has been loaded, when the disk sensor output samples on all the sample memory means indicate disk absence;

(e) a fifth disk status datum, indicative of the fact that a disk was unloaded, and another disk loaded, during the power-saving period, when the disk sensor output samples on the first and the third sample memory means indicate disk presence and, at the same time, when the disk sensor output sample on the second sample memory means indicate disk absence; and (f) a sixth disk status datum, indicative of the fact that no disk had been loaded, but one has been loaded during the power-saving period, when the disk sensor output samples on the first and the second sample memory means indicate disk absence and, at the same time, when the disk sensor output sample on the third sample memory means indicate disk presence.

11. The rotating disk data storage system of claim 10 wherein the disk status means of the interface comprises a disk status memory for storing any one of the six possible disk status data, for delivery to the processor on demand.

12. A rotating disk data storage system operating under the control of a processor, comprising:

(A) a data storage device comprising:
  (a) a transducer for data transfer with a rotating data storage disk being held in a preassigned position; and
  (b) disk sensor means for providing an output signal indicative of whether a data storage disk is in the preassigned position or not; and (B) an interface for connecting the data storage device to a processor, the interface comprising:
  (a) power-saving means for generating a power-saving signal under the direction of the processor, the power-saving signal having a power-saving state, indicative of the fact that the data storage device is in a power-saving state, and a non-power-saving state indicative of the fact that the data storage device is not in a power-saving state;
  (b) the output signal of the disk sensor means of the data storage device being correctly representative of disk presence or absence both when the power-saving signal is in the non-power-saving state and as long as no disk change is made during the power-saving state of the power-saving signal, and, in the event of a change from one disk to another during the power-saving state of the power-saving signal, being indicative of disk absence from the moment said one disk was unloaded to, at the earliest, the moment the power-saving signal subsequently gains a non-power-saving state;
  (c) drive select means for generating a drive select signal under the direction of the processor, the drive select signal having a select state, indicative of the fact that the data storage device is chosen for data transfer with the rotating data storage disk, and a not-select state indicative of the fact that the data storage device is not, the select state of the drive select signal beginning after the beginning of each non-power-saving state of the power-saving signal;
  (d) first sample memory means connected to the disk sensor means for storing a sample of the output signal thereof between the end of the select state of the drive select signal and the end of each non-power-saving state of the power-saving signal;
  (e) second sample memory means connected to the disk sensor means for storing a sample of the output signal thereof between the end of each power-saving state of the power-saving signal and the end of each not-select state of the drive select signal;
  (f) third sample memory means connected to the disk sensor means for storing a sample of the output signal thereof at the beginning of the select state of the drive select signal; and
  (g) disk status means connected to the first, the second and the third sample memory means for ascertaining a history of disk loading and unloading past each power-saving state of the power-saving signal on the basis of the three samples of the output signal of the disk sensor means stored on the sample memory means.

13. The rotating disk data storage system of claim 12 wherein the disk status means of the interface produces:

(a) a first disk status datum, indicative of the fact that a disk has been left loaded throughout the power-saving period, when the disk sensor output samples on all the sample memory means indicate disk presence;

(b) a second disk status datum, indicative of the fact that a disk has been unloaded after the start of the non-power-saving period, when the disk sensor output samples on the first and the second sample memory means indicate disk presence and, at the same time, when the disk sensor output sample on the third sample memory means indicates disk absence;

(c) a third disk status datum, indicative of the fact that a disk has been unloaded during the power-saving period, when the disk sensor output sample on the first sample memory means indicates disk presence and, at the same time, when the disk sensor output samples on the second and the third sample memory means indicate disk absence;

(d) a fourth disk status datum, indicative of the fact that no disk has been loaded, when the disk sensor output samples on all the sample memory means indicate disk absence;

(e) a fifth disk status datum, indicative of the fact that a disk was unloaded, and another disk loaded, during the power-saving period, when the disk sensor output samples on the first and the third sample memory means indicate disk presence and, at the same time, when the disk sensor output sample on the second sample memory means Indicate disk absence; and (f) a sixth disk status datum, indicative of the fact that no disk had been loaded, but one has been loaded during the power-saving period, when the disk sensor output samples on the first and the second sample memory means indicate disk absence and, at the same time, when the disk sensor output sample on the third sample memory means indicate disk presence.

14. The rotating disk data storage system of claim 13 wherein the disk status means of the interface comprises a disk status memory for storing any one of the six possible disk status data, for delivery to the processor on demand.

* * * * *